United States Patent [19]

Sugiyama

[11] Patent Number: 5,592,229
[45] Date of Patent: Jan. 7, 1997

[54] VIDEO SIGNAL INTERFRAME PREDICTIVE CODING APPARATUS USING MOTION DETECTION

[75] Inventor: Kenji Sugiyama, Yokosuka, Japan

[73] Assignee: Victor Company of Japan, Ltd., Yokohama, Japan

[21] Appl. No.: 453,345

[22] Filed: May 30, 1995

Related U.S. Application Data

[63] Continuation of Ser. No. 969,770, Oct. 30, 1992, abandoned.

[30] Foreign Application Priority Data

Oct. 31, 1991 [JP] Japan .................................... 3-313609

[51] Int. Cl.$^6$ ..................................................... H04N 7/32
[52] U.S. Cl. ............................................................ 348/416
[58] Field of Search ..................................... 358/136, 133; 348/416, 415, 409, 402, 401, 400, 390, 384, 420; H04N 7/137

[56] References Cited

U.S. PATENT DOCUMENTS

| | | | |
|---|---|---|---|
| 4,780,760 | 10/1988 | Waldman et al. | 358/105 |
| 4,805,017 | 2/1989 | Kaneko et al. | 358/105 |
| 4,942,465 | 7/1990 | Ohta | 358/133 |
| 4,982,285 | 1/1991 | Sugiyama | 358/136 |
| 4,985,768 | 1/1991 | Sugiyama | 358/136 |
| 4,987,490 | 1/1991 | Ohta | 358/136 |
| 5,103,307 | 4/1992 | Sugiyama | 358/136 |
| 5,177,608 | 1/1993 | Ohki et al. | 358/136 |
| 5,191,414 | 3/1993 | Sugiyama | 358/136 |
| 5,241,383 | 8/1993 | Chen et al. | 358/136 |

FOREIGN PATENT DOCUMENTS 3444836  6/1986  Germany.

OTHER PUBLICATIONS

IEEE Transactions on Communications, vol. 37, No. 4, Apr. 1989, pp. 380–386.

*Primary Examiner*—Tommy P. Chin
*Assistant Examiner*—Bryan S. Tung
*Attorney, Agent, or Firm*—Jacobson, Price, Holman & Stern, PLLC

[57] ABSTRACT

A video signal is coded by intraframe coding. The coded video signal is then decoded by intraframe/field decoding. A decoded local video signal is generated, which corresponds to a specific region in one frame of a video signal coded one frame prior to the video signal. A first motion signal is generated, which indicates motion of pictures in both the decoded video signal and the decoded local video signal. The motion signal is then subtracted from the video signal to generate a predictive error signal which is then coded by intraframe coding. The coded video signal and the coded predictive error signal are decoded by intraframe/field-decoding. A second motion signal is generated, which indicates motion of pictures in both the decoded video signal and a video signal decoded one frame prior to a video signal to be reproduced. The decoded predictive error signal and the second motion signal are added to each other to reproduce the video signal.

8 Claims, 4 Drawing Sheets

VIDEO SIGNAL INTERFRAME PREDICTIVE CODING APPARATUS USING MOTION DETECTION

This is a Continuation of application Ser. No. 07/969,770 filed Oct. 30, 1992.

BACKGROUND OF THE INVENTION

This invention relates to an apparatus that encodes video signals efficiently with fewer codes and an apparatus that decodes the coded signals, in their use for recording, transmission and display systems, and more particularly to a coding/decoding apparatus for video signals possible of random access and search.

In particular, efficient coding has been realized by intraframe predictive coding which utilizes interframe correlation of video signals to predict, from already coded frames, the frames to be coded, and encodes predictive error signals alone.

Furthermore, recent attention has been directed to technology of motion-compensating interframe prediction to predict motion by moving pictures.

On the other hand, it has been made for the coding for storage media to respond to random access and high-speed search.

A conventional coding apparatus is exemplified in FIG. 1.

In FIG. 1, a video signal applied to a video signal input terminal 1 is led to a predictive subtracter 3, where a predictive signal given via a switch 15 is subtracted from the video signal, thus generating a predictive error signal.

The predictive error signal is encoded by an intraframe encoder 5 to be compressed data. The data is outputted via a data output terminal 7 and applied to an intraframe decoder 9 which generates a reproduced predictive error signal.

In an inverse predictive adder 11, a predictive signal is added to the reproduced predictive error signal, thus reproducing the video signal.

The reproduced video signal is stored in a frame memory (FM) 13, and applied to a terminal P of the switch 15 after delay by one frame.

The switch 15 is controlled by a synchronous signal separated from the inputted video signal. And, in an independent frame of every N frames, a terminal S is connected to a terminal I, whereas in other predictive frames the terminal S is connected to terminal P.

The terminal P has been supplied with a reproduced video signal of the preceding frame. An interframe predictive coding circuit is formed when the terminal S is connected to the terminal P.

The terminal I has been supplied with a fixed value (O). When the terminal S is connected to the terminal I, the output signal of the predictive subtracter 3 becomes the same as the input video signal, that is, an intraframe independent coding circuit is formed.

FIG. 2 shows a conventional video signal decoding apparatus. In this apparatus, the data supplied from a data input terminal 17 is decoded by an intraframe decoder 19.

And in a reverse predictive adder 21, a predictive signal applied via a switch 27 is added to the decoded signal, thus reproducing the video signal.

The reproduced video signal is outputted via a video signal output terminal 23, and is concurrently stored in a frame memory 25.

The signal is delayed by one frame in the frame memory 25, and then applied to the reverse predictive adder 21 via the switch 27. The switch 27 is controlled by a frame-synchronizing signal separated from the input data as in the case of the coding apparatus.

In the intraframe coding apparatus 5 of FIG. 1, discrete cosine transform (DCT) is first carried out. The transformed output is then quantized, and the quantized data is variable-length encoded by such codes as Huffman codes.

In the intraframe decoders 9 and 19 of FIGS. 1 and 2, the data coded to variable lengths is first decoded to a fixed length and then transformed to a quantized representative value, which is reversely discrete cosine transformed to a reproduced signal.

Such conventional coding/decoding apparatuses process periodical independent frames. This decreases the coding efficiency because the independent frames produce a large amount of data as compared with the predictive frames.

Japanese Patent Application No. 3(1991)-393 by the same applicant as the present invention discloses video signal coding/decoding apparatuses.

In the coding apparatus, a video signal of the present frame is coded and is then decoded. The decoded signal including the video signal and quantization error is subtracted from the video signal to generate a difference signal.

The difference signal is added to the video signal in coding of a video signal of the next frame. This results in coded data including the video signal of the next frame and the quantization error of the preceding frame with the opposite polarity, In the decoding apparatus, decoded video signals of the present and the next frames are added to each other (inter frame addition) to cancel the quantization error generated in the coding.

As a result, a reproduced video signal keeps better image quality even if the number of quantization steps in the coding is made less. An amount of the coded data thus can be made less.

When a pass band of a time direction low pass filter (LPF) realized by the interframe addition is narrowed, that is, almost the coded data of the preceding frame is used in time integral in the interframe, image quality is improved if there is less image change in the interframe.

On the other hand, image quality will be deteriorated if there is a motion picture. Therefore, the pass band of the time direction LPF cannot be narrowed so much and the amount of the coded data cannot be made less in motion picture signal coding.

SUMMARY OF THE INVENTION

A purpose of the present invention is to provide a video signal coding apparatus, wherein a predictive error signal produced based on interframe/field addition is coded, and an apparatus for decoding the video signal in response to the predictive error signal.

According to the present invention, there is provided a video signal coding apparatus.

The coding apparatus comprises first coding means for intraframe/field-coding a video signal of a present frame/field to be coded to obtain a coded video signal, first decoding means for decoding the coded video signal to obtain a decoded local video signal, first addition means for adding the decoded local video signal of the present frame/field and a reproduced local video signal of another frame/ field to obtain a temporal addition video signal, subtraction means for subtracting the temporal addition video signal from the video signal of the present frame/field to obtain an error signal, second coding means for intraframe/field-coding the error signal to obtain a coded error signal, second decoding means for intraframe/field-decoding the coded error signal to obtain a local decoded error signal and second addition means for adding the local decoded error signal and the temporal addition video signal to obtain a reproduced local video signal of the present frame/field.

According to the present invention, there is further provided a video signal decoding apparatus.

The decoding apparatus comprises a decoder for intraframe/field-decoding a coded video signal and a coded predictive error signal, respectively, a detector, responsive to the decoded video signal and a video signal decoded one frame/field or more prior to a video signal to be reproduced, for generating a motion signal indicating motion of pictures in both video signals, and a reproducer for adding the decoded predictive error signal and the motion signal, thus reproducing the video signal.

According to the present invention, there is further provided a video signal coding/decoding system.

The system comprises a first encoder for intraframe/field-coding a video signal to be coded, a first decoder for intraframe/field-decoding the coded video signal, a first generator for generating a first decoded local video signal corresponding to a specific region in one frame/field of a video signal coded one frame/field or more prior to the video signal to be coded, a first detector, responsive to the decoded video signal and the first decoded local video signal, for generating a first motion signal indication motion of pictures in both video signals, a second generator for subtracting the first motion signal from the video signal to be coded, thus generating a predictive error signal, a second encoder for intraframe/field-coding the predictive error signal, a second decoder for intraframe/field-decoding the coded video signal and the coded predictive error signal, respectively, a second detector, responsive to the decoded video signal and a video signal decoded one frame/field or more prior to a video signal to be reproduced, for generating a second motion signal indicating motion of pictures in both video signals, and a reproducer for adding the decoded predictive error signal and the second motion signal, thus reproducing the video signal.

According to the present invention, there is further provided a method for predictive-coding/decoding a video signal.

The method comprises the steps of intraframe/field-coding a video signal to be coded, intraframe/field-decoding the coded video signal, generating a first decoded local video signal corresponding to a specific region in one frame/field of a video signal coded one frame/field or more prior to the video signal to be coded, generating a first motion signal indicating motion of pictures in the decoded video signal and the first decoded local video signal, subtracting the first motion signal from the video signal to be coded, thus generating a predictive error signal, intraframe/field-coding the predictive error signal, intraframe/field-decoding the coded video signal and the coded predictive error signal, respectively, generating a second motion signal indicating motion of picture in the decoded video signal and a video signal decoded one frame/field or more prior to a video signal to be reproduced, and adding the decoded predictive error signal and the second motion signal, thus reproducing the video signal.

DETAILED DESCRIPTION OF PREFERRED EMBODIMENTS

Figure 3:
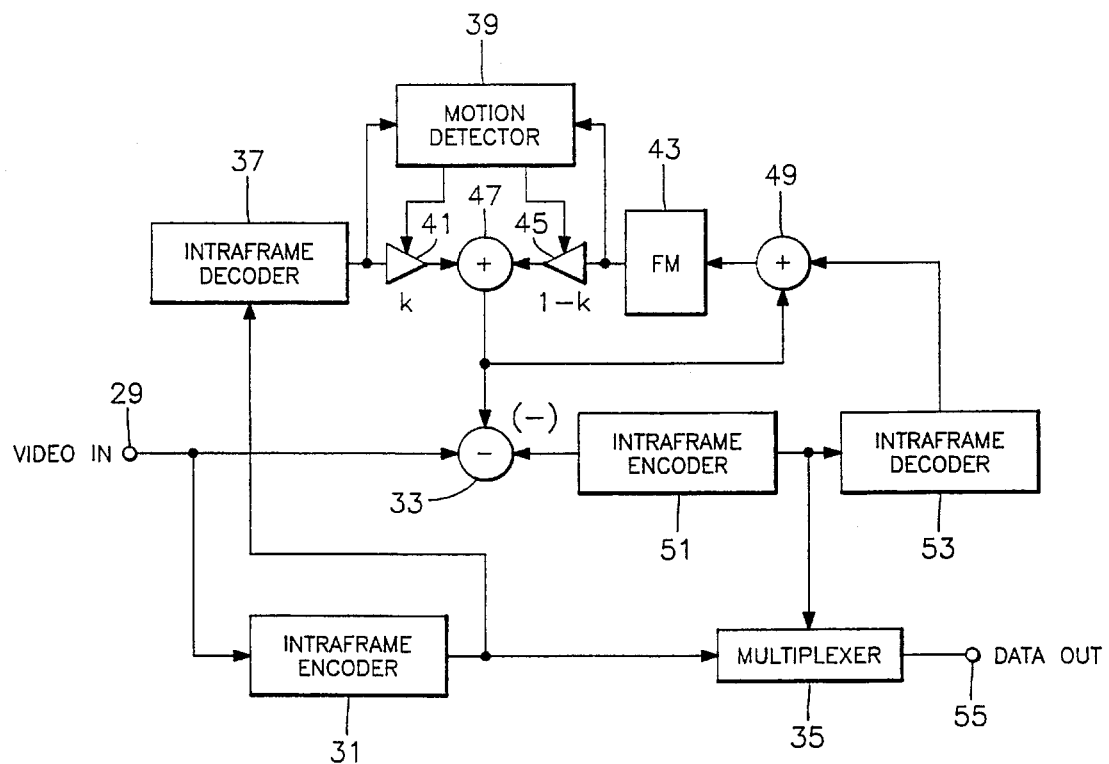
FIG. 3 is a block diagram of a preferred embodiment of a video signal coding apparatus according to the present invention.

FIG. 3 is a block diagram of a preferred embodiment of a video signal coding apparatus according to the present invention.

In FIG. 3, a video signal of the present frame is applied to an intraframe encoder 31 and a subtracter 33 via a video signal input terminal 29. The encoder 31 encodes the video signal and then applies coded data to a multiplexer 35 and an intraframe decoder 37. The decoder 37 decodes the coded data and then applies a decoded video signal to a motion detector 39 and a multiplier 41.

A reproduced local video signal of another frame which has already been decoded and stored in a frame memory (FM) 43 is applied to the motion detector 39 and a multiplier 45.

The motion detector 39 examines conformance of the decoded video signal with the reproduced local video signal per pixel and applies motion coefficients K and (1−K) to the multipliers 41 and 45, respectively.

The multipliers 41 and 45 multiply the decoded video signal and the reproduced local video signal by K and (1−K) and then apply resultant signals to an adder respectively.

The adder 47 adds the resultant signals to each other and then applies a time direction addition signal (a motion signal) as a result of the addition to the subtracter 33 and an adder 49.

Figure 4:
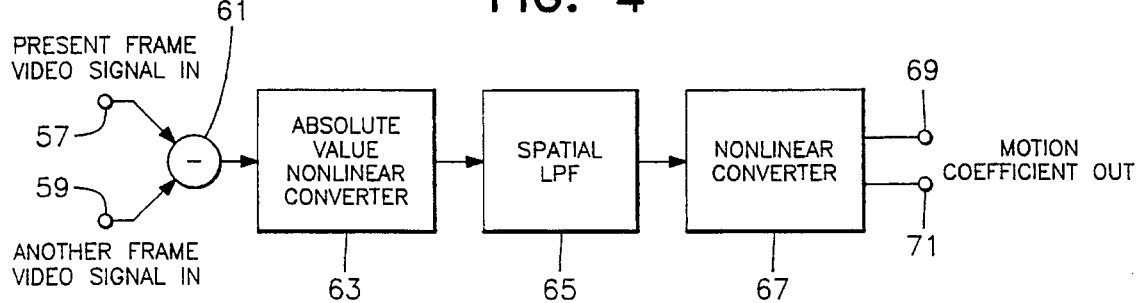
FIG. 4 is a block diagram of a motion detector used in the coding apparatus of FIG. 3.

FIG. 4 is a block diagram of the motion detector 39. The decoded video signal of the present frame and the reproduced local video signal of the other frame are applied to a subtracter 61 via input terminals 57 and respectively and the subtracter 61 outputs a difference signal.

The difference signal is firstly converted into an absolute value signal representing the absolute value of the data of the difference signal by an absolute value nonlinear converter 63.

Figure 5:
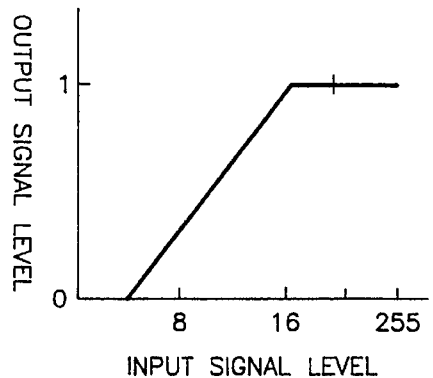
FIG. 5 shows input-output characteristics of an absolute value nonlinear converter used in the motion detector of FIG. 4.

FIG. 5 shows input-output characteristics of the nonlinear converter 63. As shown in FIG. 5, the output signal level remains 0 when the input signal level is equal to or smaller than 4 which corresponds to a noise level. The output signal level increases linearly from 0 to 1 as the input signal level increases from 4 to The output signal level remains 1 which corresponds to a saturation level when the input signal level is equal to or greater than 16. The nonlinear converter 63 functions to convert the difference between data at each dot of successive frames into a fully useful signal. Accordingly, in the function of the nonlinear converter 63 small differences are ignored and large differences are limited so that the motion of pictures can be detected substantially independent of the degree of the amplitude of pictures. The limitation on the difference suppresses erroneous operation due to pulse noises. It is preferable that the output signal from the nonlinear converter 63 has 2 bits (variable among 4 levels) or 4 bits (variable among 16 different The output signal from the nonlinear converter 63 is inputted into a spatial low pass filter (LPF) 65. The spatial LPF 65 is used to detect the degrees of variations at dots within a predetermined picture region in order to determine the motion of pictures. The spatial LPF 65 and a nonlinear converter 67 determine the motion of pictures on the basis of the degrees of variations of respective dots and on the basis of the number of dots subjected to variations in the predetermined picture region. This motion detection is insensitive to an isolated local variation even if the variation is great. Accordingly, the motion detection is protected from pulse noises and small shifts of edges of pictures. The motion detection is sensitive to a variation occurring over a wide picture region even if the variation has a small amplitude.

Figure 6:
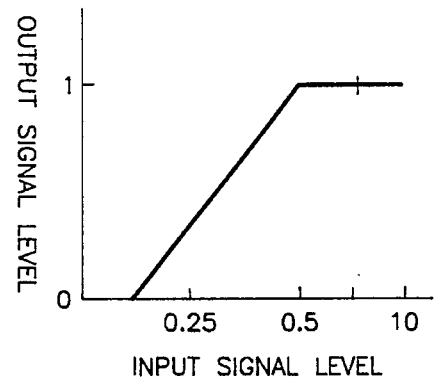
FIG. 6 shows input-output characteristics of a nonlinear converter used in the motion detector of FIG. 4.

FIG. 6 shows input-output characteristics of the nonlinear converter 67. As shown in FIG. 6, the output signal level remains 0 when the input signal level is equal to or smaller than a first predetermined level. The output signal level increases linearly from 0 to 1 as the input signal level increases from the first predetermined level to a second predetermined level. The output signal level remains 1 which corresponds to a saturation level when the input signal level is equal to or greater than the second predetermined level. Accordingly, the input signal whose level is equal to or smaller than the first predetermined level is omitted from the motion detection. On the other hand, the input signal whose level is equal to or greater than the second predetermined level is fully regarded as motion of pictures. The output signal from the nonlinear converter 63 has a plurality of bits as described previously and the spatial LPF 65 has a gentle response curve so that the processing for moving pictures and the processing for stationary pictures can be changed smoothly.

The nonlinear converter 67 outputs motion signals representing the motion coefficients (1−K) and K via coefficient terminals 69 and 71. The motion coefficients concretely varies between about 0.2 and 1 in with the degree of motion of pictures.

It should be noted that the output signal from the nonlinear circuit 63 may have a single bit and the spatial LPF 65 may have a rectangular response curve. In this case, the motion of pictures is detected only on the basis of the number of dots subjected to variations in a tap region of the spatial LPF 65.

In the case where an analog composite color signal is sampled at a frequency which equals four times the color subcarrier frequency, the taps of the spatial LPF 65 are preferably chosen to define a picture region whose vertical dimension corresponds to 3 to 5 lines and horizontal dimension corresponds to 3 to 11 dots. picture region contains 21 to 55 dots. The bit number of the spatial LPF 65 is preferably chosen to correspond to the bit number of the nonlinear circuit 63.

In FIG. 3, the subtracter 33 subtracts the time direction addition signal from the inputted video signal. A predictive error signal is then outputted from the subtracter 33 and applied to an intraframe encoder 51. The encoder 51 encodes the predictive error signal and then applies coded data to the multiplexer 35 and an intraframe decoder 53.

The multiplexer 35 multiplexes the coded data of the video signal and the predictive error signal to generate multiplexed data. The multiplexed data is sent, via a data output terminal, to a decoding apparatus which will be described later.

The decoder 53 decodes the intraframe-coded predictive error signal and generates a reproduced predictive error signal which is then applied to the adder 49.

The adder 49 adds the reproduced predictive error signal and a corresponding time direction signal to each other. A reproduced local video signal is then generated and applied to the frame memory 43.

The frame memory 43 outputs a signal which is delayed per frame from the reproduced local video signal.

Figure 1:
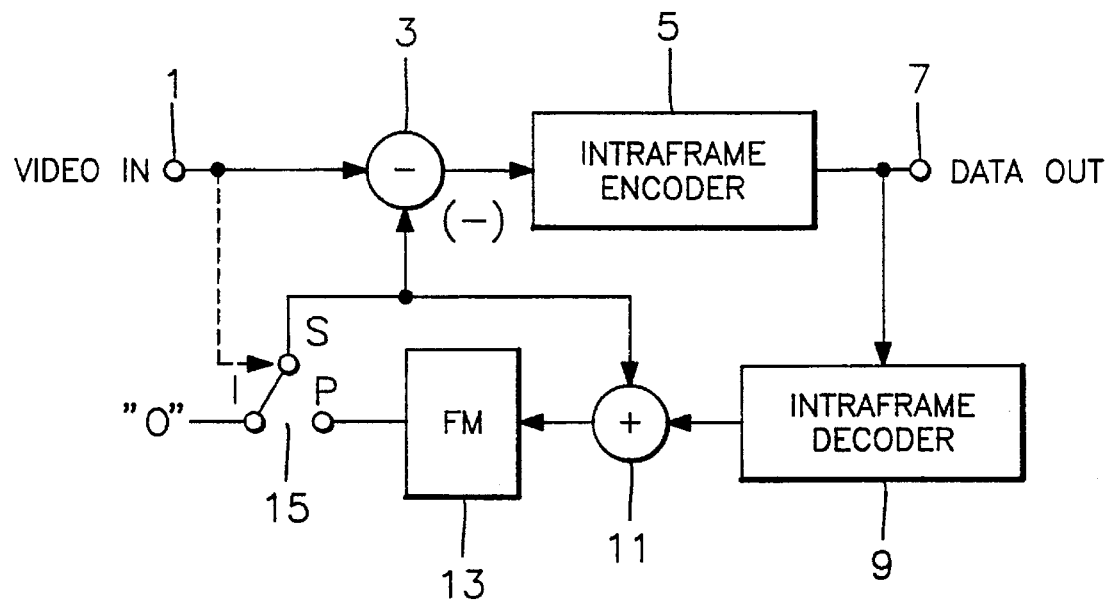
FIG. 1 is a block diagram of a conventional video signal coding apparatus.
Figure 2:
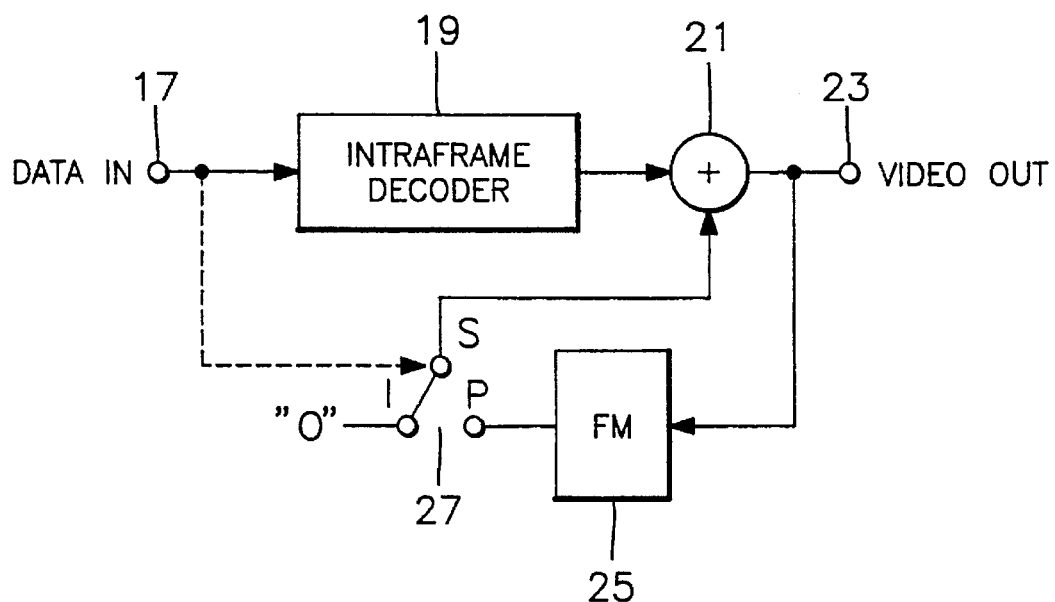
FIG. 2 is a block diagram of a conventional video signal decoding apparatus.

The intraframe encoders 31 and 51 and the intraframe decoders 37 and 53 function the same as the intraframe encoder 5 and the intraframe decoder 9, respectively of FIG. 1.

In the coding apparatus of FIG. 3, a process of subtracting a quantication error of the another frame can be carried out before intraframe coding can be carried out. Accordingly, image quality is further improved.

Figure 7:
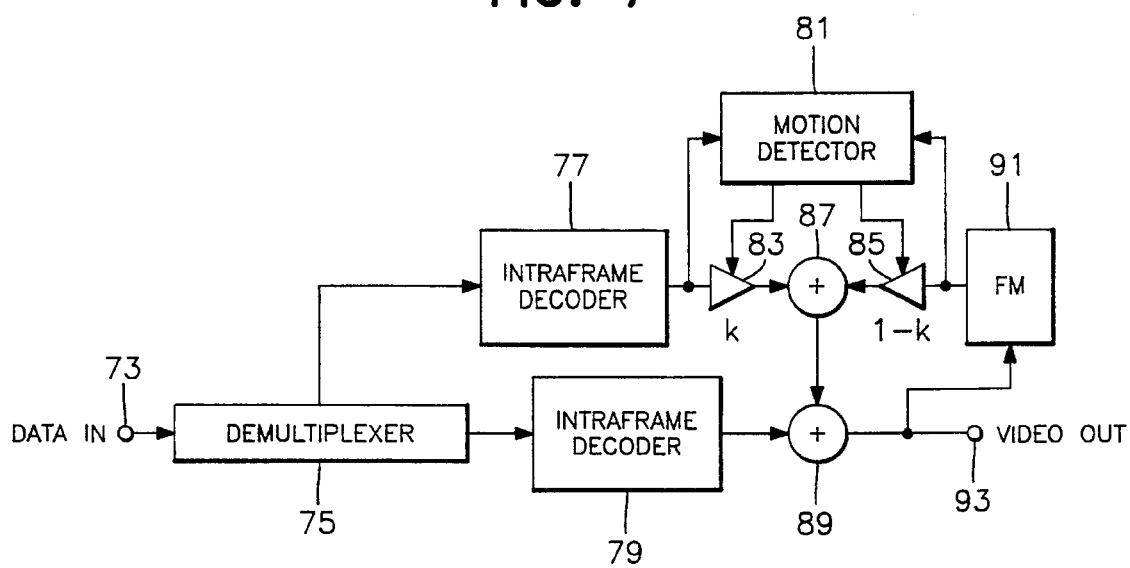
FIG. 7 is a block diagram of a preferred embodiment of a video signal decoding apparatus corresponding to the coding apparatus of FIG. 3 according to the present invention.

FIG. 7 is a block diagram of a preferred embodiment of a video signal decoding apparatus corresponding to the coding apparatus of FIG. 3 according to the present invention.

In FIG. 7, the multiplexed coded data sent from the coding apparatus of FIG. 3 is applied, via a data input terminal 73, to a demultiplexer 75 where the multiplexed coded data is separated into the coded video data and the coded prediction error data.

The coded video data is applied to an intraframe encoder 77, while the coded prediction error data is applied to an intraframe encoder 79.

The encoder 79 generates a reproduced prediction error signal which is then applied to an adder 89. A time direction signal (a motion signal) generated by an adder 87 is also applied to the adder 89.

The adder 89 adds the reproduced prediction error signal and the time direction signal and generates a reproduced video signal. The reproduced video signal is then outputted via a video signal output terminal 93 and further applied to a frame memory 91. The frame memory 91 outputs a video signal which corresponds to the reproduced video signal delayed per frame.

The intraframe decoders 77 and 79, the motion detector 81, the multipliers 83 and 85 and the adder 87 function the same as the corresponding elements in FIG. 3.

According to the video signal coding and decoding apparatuses described above, interframe addition carried out by the decoding apparatus is also carried out by the coding apparatus. The resultant addition signal is subtracted from the inputted video signal to generate a prediction error signal. The prediction error signal is then coded and sent to the decoding apparatus.

Thus, a pass band of a time direction LPF realized by the interframe addition can be narrowed without any loss of image quality. Coding of a video signal obtained by the interframe addition therefore keeps better image quality due to effect of the time direction LPF even if quantization is made rough. Furthermore, the amount of coded data is made less.

Figure 8:
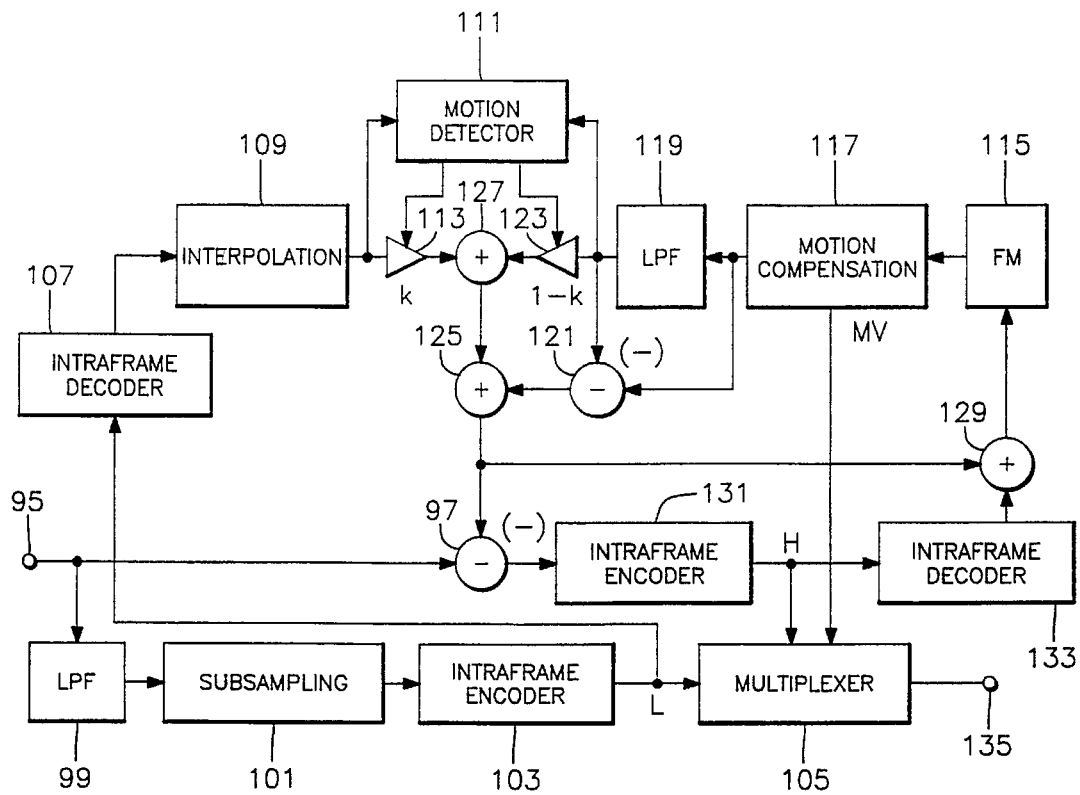
FIG. 8 is a block diagram of another preferred embodiment of a video signal coding apparatus according to the present invention.

FIG. 8 is a block diagram of another preferred embodiment of a video signal coding apparatus according to the present invention.

In FIG. 8, a video signal of the present frame is applied to a subtracter 97 and LPF 99 via a video signal input terminal 95. The inputted video signal is band restricted in a spatial frequency corresponding to that before subsampling by LPF 99 and is applied to a subsampler 101.

The subsampler 101 subsamples the band restricted signal by one-half in vertical and horizontal spatial frequencies. An outputted signal from the subsampler 101 is then applied to an intraframe encoder 103.

The encoder 103 conducts intraframe coding and generates coded data of low frequency component. The coded data is sent to a decoding apparatus described later, via a multiplexer 105, and also to an intraframe decoder 107. The encoder 103 is provided here for processing the subsampled video signal and a number of pixels to be processed is one-fourth of that of the inputted video signal.

The decoder 107 decodes the coded data of low frequency and generates a reproduced video signal of the present frame. The reproduced signal is then applied to an interpolator 109. The interpolator 109 interpolates the reproduced video signal to produce pixels the number of which corresponds to that extinguished by the subsampler 101. Thus, the total number of pixels outputted from the interpolator 109 becomes the same as that of the inputted video signal. An outputted signal from the interpolator 109 is then applied to a motion detector 111 and a multiplier 131.

A reproduced local video signal of another frame which has already been decoded is stored in a frame memory 115 and is applied to a motion compensator 117. The motion compensator 117 detects a motion vector and moves a picture per pixel according to the motion vector. A motion compensated signal is applied to LPF 119 and a subtracter 121. Motion vector data is applied to the multiplexer 105.

LPF 119 conducts the same function of LPF 99 and an output signal from LPF 119 is applied to the motion detector 111, a multiplier 123 and the subtracter 121.

The subtracter 121 subtracts a low frequency component of the output signal of LPF 119 from the motion-compensated signal. A motion-compensated interframe prediction signal of high frequency component is thus generated and applied to an adder 125.

The adder 125 adds a time direction addition signal of low frequency component from an adder 127 and the motion compensated interframe prediction signal of high frequency component from the subtracter 121 to each other. An output signal of the adder 125 is then applied to a subtracter 97 and an adder 129.

The subtracter 97 subtracts the output signal of the adder 125 from the inputted video signal to generate a prediction error signal. The prediction error signal is then applied to an intraframe encoder 131.

The encoder 131 encodes the prediction error signal and coded data thereof is applied to the multiplexer 105 and an intraframe decoder 133. The decoder 133 decodes prediction error of the inputted picture and the number of pixels processed here is the same as of the inputted video signal.

The multiplexer 105 multiplexes the two coded data (the coded video signal and the coded prediction error signal) and the motion vector data to generate multiplexed data. The multiplexed data is then applied, via a data output terminal 135, to a decoding apparatus described later.

A prediction error signal decoded by the decoder 133 is added to the time direction addition signal of low frequency component outputted from the adder 125 by the adder 129. A local video signal is thus reproduced. The reproduced local video signal is then delayed per frame by the frame memory 115.

In FIG. 8, the intraframe encoders 103 and 131, the intraframe decoders 107 and 133, the motion detector 111, the multipliers 113 and 123 and the adder 127 function the same as the corresponding elements of the apparatus shown in FIG. 3.

Figure 9:
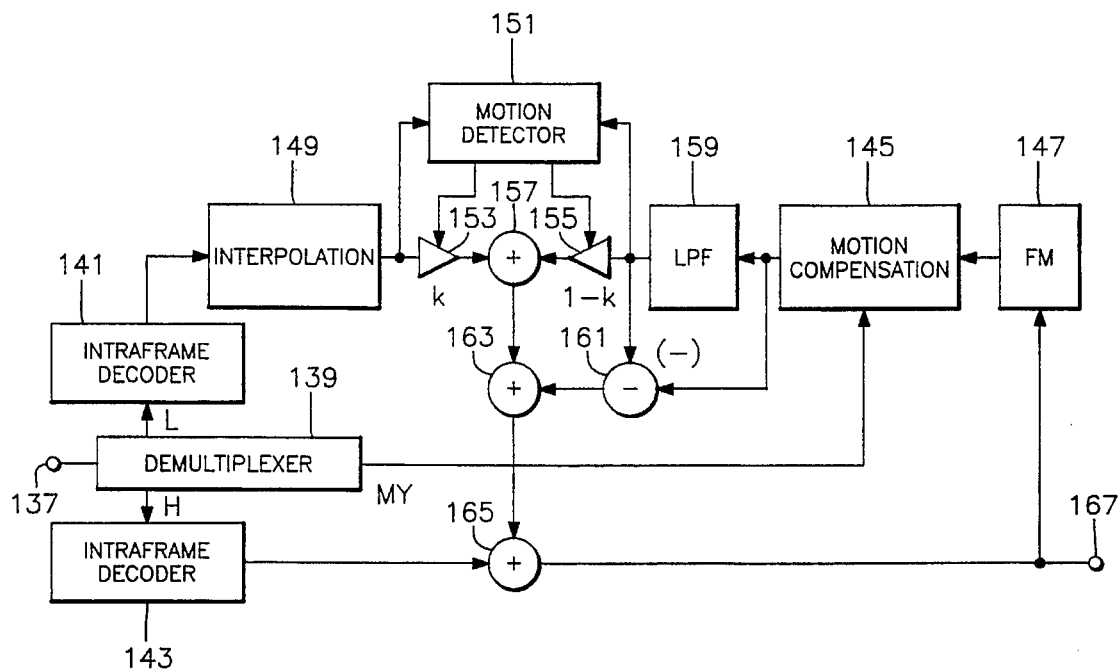
FIG. 9 is a block diagram of another preferred embodiment of a video signal decoding apparatus corresponding to the coding apparatus of FIG. 8 according to the present invention.

FIG. 9 is a block diagram of another preferred embodiment of a video signal decoding apparatus corresponding to the coding apparatus of FIG. 8 according to the present invention.

The multiplexed data sent from the coding apparatus of FIG. 8, via a data input terminal 137, is separated into the coded video data of low frequency component, the coded prediction error data of high frequency component and the motion vector data.

The coded video data, the coded prediction error data and the motion vector data are applied to an intraframe decoder 141, an intraframe decoder 143 and a motion compensator 145, respectively. An already reproduced video signal stored in a frame memory 147 is then applied to the motion compensator 145.

The motion compensator 145 compensates the reproduced video signal by means of the motion vector data, however, does not detect motion vector. The motion vector data used by the motion compensator 145 is the data sent from the coding apparatus of FIG. 8. Thus, an output signal of the motion compensator 145 is motion compensated the same as the output signal of the motion compensator 117 of FIG. 8 being motion compensated.

An output signal of an adder 163 is added to the output signal of the decoder 143 by an adder 165 to generate a reproduced video signal. The reproduced video signal is stored into the frame memory 147 and outputted via a video signal output terminal 167.

The intraframe decoders 141 and 143, an interpolator 149, a motion detector 151, multipliers 153 and 155, adders 157 and 163, LPF 159 and a subtracter 161 function the same as the corresponding elements of the coding apparatus of FIG. 8.

According to the coding and decoding apparatuses of FIGS. 8 and 9, the same as those of FIGS. 6 and 7, coding of a video signal obtained by the interframe addition therefore keeps better image quality due to effect of the time direction LPF even if quantization is made rough. Furthermore, the amount of coded data is made less.

In FIGS. 8 and 9, the interframe prediction error signal of high frequency component and the time direction addition signal of low frequency component can be unified and coded because the low frequency component only is treated as an independent frame.

The video signal processed per frame in the above embodiments can be processed per field.

Furthermore, the above preferred embodiments can be applied, for example, to circular prediction in every other frame in coding method such as ISO/ICE of MPEG standard where the circular prediction and non-circular prediction in a frame between circular-predictive frames are combined.

In this case, a frame in the non-circular prediction must be predicted by means of circular-predictive frames. However, in the embodiments, the frame in the non-circular prediction can be predicted by means of the signal stored in the frame memory.

What is claimed is:

1. An apparatus for coding a video signal, comprising:

first coding means for coding a video signal of a present frame/field to be coded to obtain a coded video signal;

first decoding means for decoding the coded video signal to obtain a decoded video signal;

first addition means for adding the decoded video signal of the present frame/field and a local video signal reproduced least one frame/field prior to the present frame/field to temporal addition video signal;

subtraction means for subtracting the temporal video signal from the video signal of the present frame/field coded to obtain a predictive error signal;

second coding means for coding the predictive error signal to obtain a coded predictive error signal;

second decoding means for decoding the coded predictive error signal to obtain a decoded predictive error signal;

second addition means for adding the decoded predictive error signal and the temporal addition video signal to obtain reproduced local video signal of the present frame/field; and motion detection means, responsive to the decoded video signal of the present frame/field and the local video signal reproduced at one frame/field prior to the present frame/field, for motion signal indicating motion of pictures in both the video signal and the reproduced local video signal, wherein motion detection means comprises:

first conversion means for comparing an absolute value of a difference between the decoded video signal and the reproduced local video signal with a specific value, thus generating a first signal corresponding to the absolute value the difference is smaller than the specific value, and if not, generating a second signal corresponding to the absolute value being restricted to a specific level; and second conversion means, responsive to interframe/interfield difference of pixels in a specific one frame/field of the first or the second signal generated by first conversion means, for generating the motion signal.

2. A predictive decoding apparatus for reproducing video signal, responsive to a coded video signal and a coded predictive error signal generated based on motion of pictures the coded video signal and a video signal coded at least one frame/field prior to the coded video signal, the apparatus comprising:

first decoding means for decoding the coded video signal of a present frame/field to obtain a decoded video signal;

second decoding means for decoding the coded predictive error signal to obtain a decoded predictive error signal;

reproducing means for reproducing a video signal of another frame/field;

adaptive addition means for obtaining a temporal addition video signal adaptively varying a composite ratio of the video signal of the present frame/field and a reproduced video signal of another frame/field and adding both the decoded signal and the reproduced video signal to each other in with motion of pictures in the decoded video signal and the reproduced video signal; and addition means for adding the decoded predictive error signal and the temporal addition video signal, thus obtaining a reproduced video signal of the present frame/field.

3. An apparatus according to claim 2, further comprising motion detection means, responsive to the decoded video signal and a reproduced video signal which is reproduced at least one frame/field prior to a video signal to be reproduced, for generating a motion signal indicating motion of pictures in the decoded video signal and the reproduced video signal, the motion detection means comprises:

first conversion means for comparing an absolute value of a difference between the decoded video signal and the video signal with a specific value, thus generating a first signal corresponding to the absolute value if the difference is smaller than the specific value, and if not, generating a second signal corresponding to the absolute value being restricted to a specific level; and second conversion means, responsive to interframe/interfield difference of pixels in a specific region of one frame/field of the first or the second signal generated by the first conversion means, for generating motion signal.

4. A system for predictive-coding/decoding a video signal, comprising:

first coding means for intraframe/intrafield coding a video signal to be coded;

first decoding means for intraframe/intrafield decoding the coded video signal;

first generation means for generating a first decoded local video signal corresponding to a specific region in one frame/field of a video signal coded one frame/field or more to the video signal to be coded;

first detection means, responsive to the decoded video signal and the first decoded local video signal, for first motion signal indicating motion of pictures in both the decoded video signal and the first decoded local video signal;

second generation means for subtracting the first motion signal from the video signal to be coded, thus generating a predictive error signal;

second coding means for intraframe/intrafield coding the predictive error signal;

second decoding means for intraframe/intrafield decoding both the coded video signal and the coded predictive error signal;

second detection means, responsive to the decoded video signal and a video signal decoded at least one frame/field prior to a video signal to be reproduced, for generating a second motion signal indicating motion of pictures in decoded video signal and the video signal decoded at least one frame/field prior to a video signal to be reproduced; and reproducing means for adding the decoded predictive error signal and the second motion signal, thus reproducing the signal.

5. A method for predictive-coding/decoding a video signal, comprising:

intraframe/intrafield coding a video signal to be coded;

intraframe/intrafield decoding the coded video signal;

generating a first decoded local video signal corresponding to a specific region in one frame/field of a signal coded at least one frame/field prior to the video signal to be coded;

generating a first motion signal indicating motion of pictures in the decoded video signal and the first decoded video signal;

subtracting the first motion signal from the video signal to be coded, thus generating a predictive error signal;

intraframe/intrafield coding the predictive error signal;

intraframe/intrafield decoding both the coded video signal and the coded predictive signal;

generating a second motion signal indicating motion of pictures in the decoded video signal and a video signal least one frame/field prior to a video signal to be reproduced; and adding the decoded predictive error signal and the second motion signal, thus reproducing the video signal.

6. An apparatus for coding a video signal, comprising:

first coding means for coding a video signal of a present frame/field to be coded to obtain a coded video signal;

first decoding means for decoding the coded video signal to obtain a decoded video signal;

first addition means for adding the decoded video signal of the present frame/field and a local video signal reproduced least one frame/field prior to the present frame/field to temporal addition video signal;

subtraction means for subtracting the temporal addition video signal from the video signal of the present frame/field coded to obtain a predictive error signal;

second coding means for coding the predictive error signal to obtain a coded predictive error signal;

second decoding means for decoding the coded predictive error signal to obtain a decoded predictive error signal; and second addition means for adding the decoded predictive error signal and the temporal addition video signal to obtain reproduced local video signal of the present frame/field;

wherein the first addition means adaptively varies a composite ratio of the decoded video the present frame/field and the reproduced local video signal least one frame/field prior to the present frame/field, thus both the decoded video signal and the reproduced local video to each other based on motion of pictures in the decoded video signal and the reproduced local video signal.

7. An apparatus for coding a video signal, comprising:

first coding means for coding a video signal of a present frame/field to be coded to obtain a coded video signal;

first decoding means for decoding the coded video signal to obtain a decoded video signal;

first addition means for adding the decoded video signal of the present frame/field and a local video signal reproduced least one frame/field prior to the present frame/field to temporal addition video signal;

subtraction means for subtracting the temporal addition video signal from the video signal of the present frame/field coded to obtain a predictive error signal;

second coding means for coding the predictive error signal to obtain a coded predictive error signal;

second decoding means for decoding the coded predictive error signal to obtain a decoded predictive error signal;

second addition means for adding the decoding predictive error signal and the temporal addition video signal to obtain reproduced local video signal of the present frame/field; and adjusting means for adjusting the addition conducted by the first means according to a conformance of the decoded video signal present frame/field with the local video signal reproduced at one frame/field prior to the present frame/field.

8. An apparatus according to claim 7 wherein the adjusting means comprises:

detecting means for examining the conformance of the decoded video signal of the present frame/field with the local video signal reproduced at least one frame/field prior to the present frame/field;

first multiplying means, responsive to the conformance examined by the detecting means, for multiplying the decoded signal by a first constant K to obtain a multiplied decoded signal which is applied to the first addition means; and second multiplying means, responsive to the conformance examined by the detection means, for multiplying the local signal by a second constant (1−K) to obtain a video signal which is applied to the first addition means.

* * * * *